United States Patent
Lerner

(10) Patent No.: US 8,893,987 B2
(45) Date of Patent: Nov. 25, 2014

(54) DRIP IRRIGATION PIPE

(75) Inventor: Ari Baruh Lerner, Timorim (IL)

(73) Assignee: Netafim, Ltd., Tel Aviv (IL)

( * ) Notice: Subject to any disclaimer, the term of this patent is extended or adjusted under 35 U.S.C. 154(b) by 386 days.

(21) Appl. No.: 13/505,433

(22) PCT Filed: Oct. 24, 2010

(86) PCT No.: PCT/IL2010/000876
§ 371 (c)(1),
(2), (4) Date: Jun. 15, 2012

(87) PCT Pub. No.: WO2011/051936
PCT Pub. Date: May 5, 2011

(65) Prior Publication Data
US 2012/0248225 A1      Oct. 4, 2012

Related U.S. Application Data

(60) Provisional application No. 61/256,990, filed on Nov. 1, 2009.

(51) Int. Cl.
*B05B 15/00*     (2006.01)
*A01G 25/02*     (2006.01)

(52) U.S. Cl.
CPC .............. *A01G 25/023* (2013.01); *A01G 25/02* (2013.01)
USPC .......................................... 239/542; 239/547

(58) Field of Classification Search
CPC ................ A01G 25/023; A01G 25/02; A01G 2025/006; B05B 15/069; B05B 1/323
USPC ............... 239/542, 547, 533.13, 533.14, 602, 239/195, 196, 269, DIG. 12; 138/43, 46; 222/110, 188, 490, 572, 569, 570; 251/281, 282, 283, 294, 298, 326, 334, 251/331, 342, 340
See application file for complete search history.

(56) References Cited

U.S. PATENT DOCUMENTS

| 3,293,861 | A | * | 12/1966 | Hinde .............................. 405/61 |
| 3,307,576 | A | * | 3/1967 | Himes et al. ................ 137/527.8 |
| 4,095,750 | A | * | 6/1978 | Gilead .......................... 239/542 |
| 7,445,168 | B2 | | 11/2008 | Ruskin |
| 2006/0186228 | A1 | | 8/2006 | Belford et al. |

FOREIGN PATENT DOCUMENTS

| DE | 10 2004 059721 | 5/2006 |
| FR | 2 474 815 | 8/1981 |
| FR | 2 605 492 | 4/1988 |

OTHER PUBLICATIONS

International Search Report in PCT/IL2010/000876, dated Mar. 18, 2011.
Written Opinion in PCT/IL2010/000876, dated Mar. 18, 2011.

* cited by examiner

*Primary Examiner* — Ryan Reis
*Assistant Examiner* — Juan C Barrera
(74) *Attorney, Agent, or Firm* — Womble Carlyle

(57) ABSTRACT

A drip irrigation pipe includes a drip emitter and a flap that is formed in the pipe wall by first and second grooves. The first groove is longer than the second groove and the flap remains connected to the pipe wall at two bridges. A pivot region of the flap extends between the two bridges and the flap is adapted to twist about the pivot region as liquid exits the pipe at the flap.

15 Claims, 2 Drawing Sheets

DRIP IRRIGATION PIPE

RELATED APPLICATIONS

This is a 35 USC 371 U.S. National Phase of International Application No. PCT/IL/2010/000876 filed 24 Oct. 2010 and published in English as WO 2011/051936A1 on 5 May 2011, which claims priority to U.S. Provisional Patent Appln No. 61/256,990, filed 1 Nov. 2009. The contents of the aforementioned applications are incorporated by reference in their entirety.

TECHNICAL FIELD

Embodiments of the present invention relate to a drip irrigation pipe and in particular to an outlet formed in the wall of the pipe through which liquid flowing though the pipe may exit the pipe.

BACKGROUND

In such drip irrigation pipes, the outlet may be in the form of a flap that is formed in the wall of the pipe. German Patent No. 102004059721 describes an irrigation hose that has several longitudinal flap type discharge openings formed by sectional grooves in the hose wall and flow limiters that are arranged at the inside portion of the hose within the range of the discharge openings.

U.S. Patent Application No. 2006186228, the disclosure of which is incorporated herein by reference, describes a dripper bonded to a pipe wall that in an embodiment has two slits that are made into the pipe to form flap type outlet opening each in fluid communication with an outlet area of the dripper.

SUMMARY

The following embodiment and aspects thereof are described and illustrated in conjunction with systems, tools and methods which are meant to be exemplary and illustrative, not limiting in scope.

In an embodiment of the present invention a drip irrigation pipe comprises a drip emitter and a flap, the drip emitter being located along the pipe wall adjacent the flap so that liquid passing through the emitter is able to exit the pipe at the flap, the flap being defined by first and second grooves formed through the pipe wall and the flap remaining connected to the pipe wall at two bridges, a first one of the bridges being located between a beginning of the first groove and a location along the second groove proximal to the beginning and a second one of the bridges being located between an end of the first groove and a location along the second groove proximal to the end, a pivot of the flap extending between the bridges, wherein an operative part of the flap bound between the first groove and the pivot is sized such that liquid exiting the pipe at the flap bears against the operative part to twist the flap at a positive direction about the pivot such that any part of the flap that twists does so in the positive direction.

Optionally, the twisting of the flap in the positive direction is such that at least a portion of the operative part of the flap is urged in a direction out of the pipe.

Optionally, the operative part of the flap is larger than any part of the flap that may exist between the second groove and the pivot.

Optionally, the location of the drip emitter along the pipe wall is such that it is not attached to any portion of the flap.

Optionally, the first and second grooves extend along an imaginary cylindrical surface.

In an embodiment of the present invention a drip irrigation pipe comprises a drip emitter and a flap being defined by first and second grooves formed through the pipe wall, the drip emitter being located along the pipe wall adjacent the flap so that liquid passing through the emitter is able to exit the pipe at the flap, the first and second grooves extending each between a beginning and an end and the flap remaining connected to the pipe wall at two bridges, a first one of the bridges being located between the beginnings of the grooves and a second one of the bridges being located between the ends of the grooves, a pivot of the flap being defined as extending between the two bridges, wherein a first part of the flap bound the first groove and the pivot is larger than a second part of the flap bound by the second groove and the pivot.

Optionally, the two bridges define regions of resilience that allow the flap to rotate as water exits the pipe at the flap.

Optionally, during the rotation of the flap at least a portion of the first part of the flap is urged in a direction away from the interior of the pipe and at least a portion of the second part of the flap is urged in a direction towards the interior of the pipe.

Optionally, the location of the drip emitter along the pipe wall is such that it is not attached to any portion of the flap.

Optionally, the first and second grooves extend along an imaginary cylindrical surface.

In an embodiment of the present invention a method for producing a drip irrigation pipe comprises the steps of: providing a cutting instrument comprising a cutting edge extending along an imaginary circle, the cutting edge comprising a first cutting edge and a second cutting edge that is separated from the first cutting edge; providing an irrigation pipe comprising a pipe wall extending along an axis; urging the cutting instrument towards the pipe along a path transverse to the axis to carve a flap in the pipe wall that is formed by the first and second cutting edges respectively forming first and second grooves that extend through the pipe wall.

Optionally, the first cutting edges is longer than the second cutting edge

Optionally, at the locations where the first and second cutting edges are separated the cutting instrument leaves bridges in the pipe wall that integrally connect the flap to the pipe wall.

In addition to the exemplary aspects and embodiment described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

Figure 1:
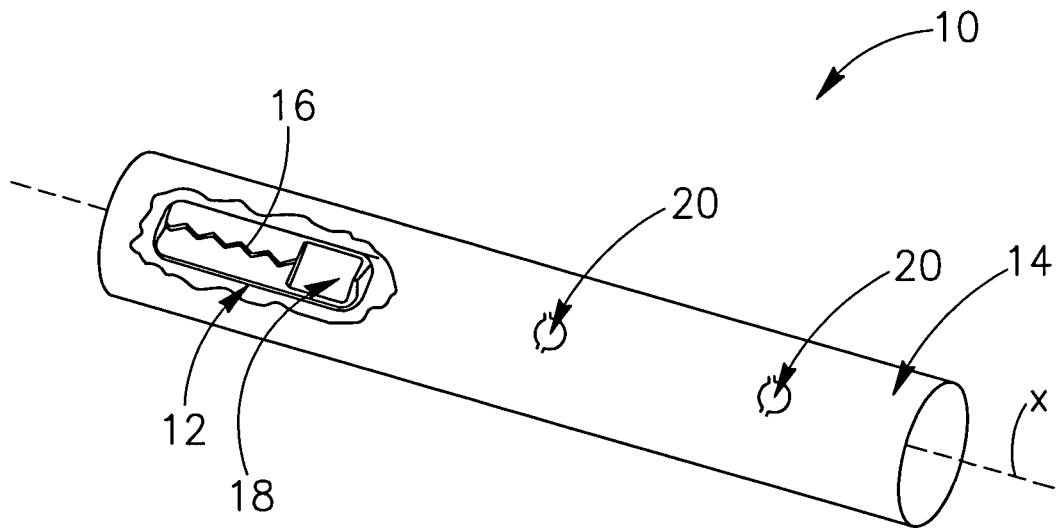
FIG. 1 schematically shows a perspective view of a drip irrigation pipe in accordance with an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Attention is first drawn to FIG. 1. A drip irrigation pipe 10 extends along a longitudinal axis X and has drip emitters 12 that are located along a wall 14 of the pipe 10. The drip emitters 12 may for example be in the form of separate units that are attached to the pipe wall 14, or may be part of a continuous strip (not shown) that is attached to the pipe wall 14, or may be integrally formed in the pipe wall 14 (not shown) such as by imprinting the emitters shape into the pipe wall 14. Each drip emitter 12 optionally has a pressure reducing passage 16 and an optional chamber 18 and liquid entering the emitter 12 from the interior of the pipe 10 may flow through the passage 16 to empty into the chamber 18.

The location of the drip emitters along the pipe wall 14 may be such that the chamber 18 in each emitter 12 is covered by the pipe wall 14. A flap 20 in accordance with embodiments of the present invention may be formed in a segment of the pipe wall 14 to provide an outlet or exit for liquid out from the pipe 10 for the purpose of irrigation. Optionally that segment of the pipe wall 14 covers the chamber 18 such that the flap 20 provides an outlet or exit for liquid out of the emitter's chamber 18.

It should be noted that directional terms appearing throughout the specification and claims, e.g. "forward", "rear", "up", "down" etc., (and derivatives thereof) are for illustrative purposes only, and are not intended to limit the scope of the appended claims. In addition it is noted that the directional terms "down", "below" and "lower" (and derivatives thereof) define identical directions and that the directional terms "inner" and "outer" refer to radial directions of the pipe 10 pointing respectively into and out of the pipe.

Figure 2:
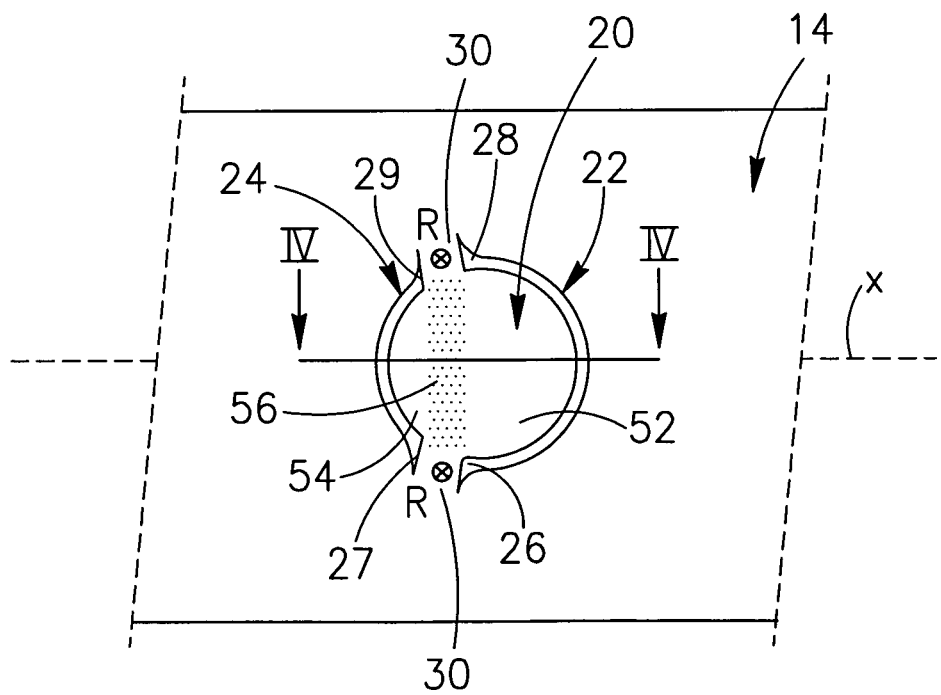
FIG. 2 schematically shows a top view of a section of the drip irrigation pipe with a flap in accordance with an embodiment of the present invention.

Attention is now drawn to FIG. 2. In accordance with the embodiments of the present invention, a first groove 22 and a second groove 24 that are formed in the pipe wall 14 define the flap 20 and the flap 20 remains integrally connected to the pipe wall 14 at two bridges 30.

In an embodiment, the first groove 22 extends from a beginning 26 to an end 28 and a first one of the bridges 30 is located between the beginning 26 of the first groove 22 and a primary location 27 along the second groove 24 that is proximal to the beginning 26 of the first groove 22. A second one of the bridges 30 is located between the end 28 of the first groove 22 and a secondary location 29 along the second groove 24 that is proximal to the end 28 of the first groove 22.

In an embodiment, the primary location 27 is located at the beginning of the second groove 24 and the secondary location 29 is located at the end of the second groove 24 (as can be seen in FIG. 2), however in other embodiments (not shown) the second groove 24 may have a more extended form that respectively begins and ends at locations that are more distal relative to the primary and secondary locations 27, 29 from the beginning 26 and end 28 of first groove 22.

The grooves 22, 24 that define the flap 20 may be formed in various ways and shapes in the pipe wall 14. The grooves 22, 24 that may be curved as seen in the figures, may also be formed in the pipe wall 14 by a cutting instrument, a laser beam (etc.). In an embodiment, the grooves 22, 24 that define the flap 20 are cut into the pipe wall 14 and optionally that cutting is performed by a punch 32.

Figure 3:
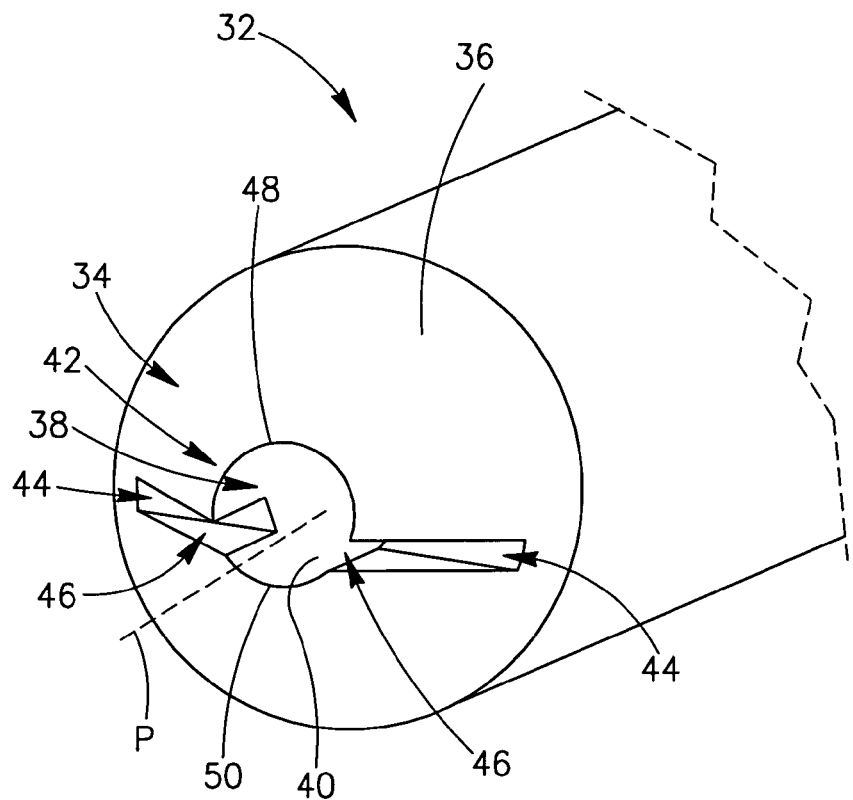
FIG. 3 schematically shows an embodiment if a punch that in accordance with some embodiments of the present invention may be used to form a flap.

Attention is now additionally drawn to FIG. 3. A punch 32 in accordance with an embodiment of the present invention extends forwardly along a longitudinal axis P to a head 34 thereof. A peripheral face 36 of the head 34 resides on an imaginary forwardly tapering cone that is formed along and about the axis P and a cavity 38 of the punch 32 having an optional cylindrical wall 40 extends through at least a portion of the punch along axis P and opens out of the punch 32 at a forward end of the punch 32 to thereby impart to the punch's head 34 a truncated coned shape. A cutting edge 42 of the punch 32 is located at the forward end along an imaginary circle that is formed at an intersection of the cylindrical wall 40 and the coned face 36.

Two recesses 44 of the punch 32 are formed in the punch's head 34. Each recess 44 bisects the cutting edge 42 at an intermission 46, opens into the cavity 38 at the cavity's wall 40 and opens out of the punch 32 at the head's face 36. The two intermissions 46 formed in the cutting edge 42 divide the cutting edge 42 into a first cutting edge 48 and a second cutting edge 50 wherein the first cutting edge 48 has a longer circular extension than the second cutting edge 50.

In some embodiments, the punch 32 may be subjected to the pipe wall 14 cutting into the pipe wall 14 with its first and second cutting edges 48, 50 to form the grooves 22, 24 that have at least portions that extend through the full width of the pipe wall 14 to open into the interior of the pipe 10 or into the emitter's chamber 18. The pipe wall 14 at the locations where it meets the intermissions 46 and recesses 44 of the punch 32 remains substantially un-cut to form the bridges 30 where the flap 20 remains integrally connected to the pipe wall 14.

In accordance with some embodiments, the first and second grooves 22, 24 optionally reside along an imaginary circle or an imaginary cylindrical surface. In a non binding example, this may be due to the first and second grooves 22, 24 being respectively formed by the first and second cutting edges 48, 50 of the punch 32 that extend along an outline of a circle as described herein above. Such construction of a cutting edge 42 that resides along an imaginary circle may be relatively easy and cheap to produce and regrind during periodic maintenance of the punch 32. The addition of the intermissions 46 imparts to such a circular cutting edge 42 the ability to form a cutting pattern in the pipe wall 14 that normally may require more complex and expensive setups.

Attention is drawn back to FIG. 2. The flap 20 in accordance with at least some of the embodiments of the present invention has first and second regions of resilience R that are formed each at a respective bridge 30 and a pivot region 56 that extends straight between the two bridges 30. An operative first part 52 of the flap 20 bound between the first groove 22 and the pivot 56 is sized such that it is larger than an optional second part 54 of the flap 20 that may exist between the second groove 24 (at its extension between the primary and secondary locations 27, 29) and the pivot 56. As indicated, the second part 54 may not exist in the flap 20 when for example the second groove 24 is formed adjacent the pivot 56.

Figure 4:
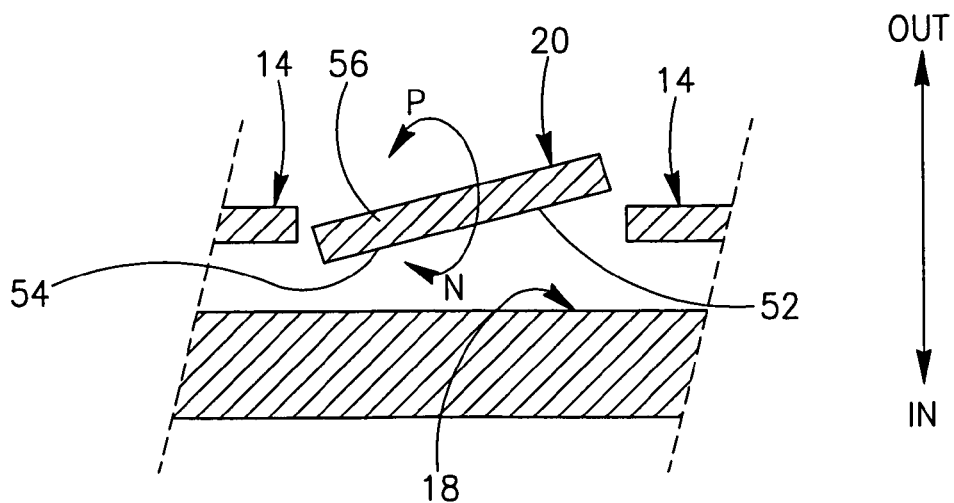
FIG. 4 schematically shows a cross sectional view taken along the line IV-IV in FIG. 2 of an embodiment of the flap when twisted.

Attention is additionally drawn to FIG. 4. During irrigation, liquid flowing through the pipe 10 reaches an inner side of the pipe wall 14 at the flap 20 optionally at the emitter's chamber 18. In an embodiment, the liquid bearing against the first part 52 of the flap 20 may urge the first part 52 outwards in a direction out of the pipe 10. In turn the optional second part 54 of the flap 20 if present may be urged inwards in a direction towards the inside of the pipe 10. By this, the flap 20 in accordance with embodiments of the present invention may be described as resiliently rotating or twisting in a positive direction P about the pivot 56 of the flap 20 to allow liquid to exit the pipe 10. This twisting is optionally facilitated by the second groove 24 that extends relatively close to the pivot 56 (as compared to the first groove 22) or adjacent to a side of the pivot 56 thereby substantially separating the pivot 56 from its association to the pipe wall 14.

As liquid pressure at the inner side of the flap 20 drops the resilience of the flap 20 at the bridges 30 and/or the pivot 56 may urge the flap 20 to at least partially twist back in a negative direction N about the pivot 56 with its first part 52 being urged inwards in a direction towards the interior of the pipe 10 and its second optional part 54 being urged outwards in a direction away from the interior of the pipe 10.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although the above embodiments have been described to a certain degree of particularity, it should be understood that various alterations and modifications could be made without departing from the scope of the invention as hereinafter claimed. For example, the flap 20 may be formed such that the pivot 56 as viewed from a direction similar to that of FIG. 2 may be seen to extend along a direction that is generally perpendicular (as currently presented in FIG. 2), transverse or parallel to the pipe axis X. In addition for example, more than two bridges 30 may be associated with a flap 20 that is able to twist as liquid exits the pipe. For example, two or more bridge-segments may be formed at the location of each bridge 30 and still impart to the flap 20 an ability to resiliently twist.

The invention claimed is:

1. A drip irrigation pipe comprising a drip emitter and a flap,
   the drip emitter being located along the pipe wall adjacent the flap so that liquid passing through the emitter is able to exit the pipe at the flap,
   the flap being defined by first and second slits formed through the pipe wall and the flap remaining connected to the pipe wall at two bridges, a first one of the bridges being located between a beginning of the first slit and a first location along the second slit proximal to the beginning, a second one of the bridges being located between an end of the first slit and a second location along the second slit proximal to the end, and a pivot of the flap extending between the bridges, wherein the first and second slits do not merge with one another and;
   an operative part of the flap bound between the first slit and the pivot is sized such that liquid exiting the pipe at the flap bears against the operative part to twist the flap in a positive direction about the pivot such that any part of the flap that twists does so in the positive direction.

2. The drip irrigation pipe according to claim 1, wherein the twisting of the flap in the positive direction is such that at least a portion of the operative part of the flap is urged in a direction out of the pipe.

3. The drip irrigation pipe according to claim 1, wherein the operative part of the flap is larger than any part of the flap located between the second slit and the pivot.

4. The drip irrigation pipe according to claim 1, wherein the location of the drip emitter along the pipe wall is such that it is not attached to any portion of the flap.

5. The drip irrigation pipe according to claim 1, wherein the first and second slits extend along a cylindrical surface of the pipe wall.

6. A drip irrigation pipe comprising a drip emitter and a flap being defined by first and second slits formed through the pipe wall,
   the drip emitter being located along the pipe wall adjacent the flap so that liquid passing through the emitter is able to exit the pipe at the flap,
   the first and second slits each extending between a beginning and an end and the flap remaining connected to the pipe wall at two bridges, a first one of the bridges being located between the beginnings of the slits and a second one of the bridges being located between the ends of the slits such that the first and second slits do not merge with one another,
   a pivot of the flap being defined as extending between the two bridges, wherein
   a first part of the flap bound by the first slit and the pivot is larger than a second part of the flap bound by the second slit and the pivot.

7. The drip irrigation pipe according to claim 6, wherein the two bridges define regions of resilience that allow the flap to rotate as water exits the pipe at the flap.

8. The drip irrigation pipe according to claim 7, wherein during the rotation of the flap, at least a portion of the first part of the flap is urged in a direction away from an interior of the pipe and at least a portion of the second part of the flap is urged in a direction towards the interior of the pipe.

9. The drip irrigation pipe according to claim 6, wherein the location of the drip emitter along the pipe wall is such that it is not attached to any portion of the flap.

10. The drip irrigation pipe according to claim 6, wherein the first and second slits extend along a cylindrical surface of the pipe wall.

11. A method for producing a drip irrigation pipe according to claim 1, comprising the steps of:
    providing a cutting instrument comprising a cutting edge extending along an imaginary circle, the cutting edge comprising a first cutting edge and a second cutting edge that is separated from the first cutting edge,
    providing an irrigation pipe comprising a pipe wall extending along an axis,
    urging the cutting instrument towards the pipe along a path transverse to the axis to carve a flap in the pipe wall that is formed by the first and second cutting edges respectively forming first and second slits that extend through the pipe wall.

12. The method according to claim 11, wherein the first cutting edge is longer than the second cutting edge.

13. The method according to claim 11, wherein at locations where the first and second cutting edges are separated, the cutting instrument leaves bridges in the pipe wall that integrally connect the flap to the pipe wall.

14. The method according to claim 11, further comprising; attaching a drip emitter to an inside of the pipe wall.

15. The method according to claim 11, wherein the first and second slits are formed to extend along a cylindrical surface.

* * * * *